( 12 ) United States Patent
Locke et al.

(10) Patent No.: US 12,521,279 B2
(45) Date of Patent: Jan. 13, 2026

(54) ABSORBENT DRESSING WITH REMOTE MEASUREMENT OF DRESSING MOISTURE

(71) Applicant: Solventum Intellectual Properties Company, Maplewood, MN (US)

(72) Inventors: Christopher Brian Locke, Bournemouth (GB); Justin Alexander Long, Lago Vista, TX (US)

(73) Assignee: Solventum Intellectual Properties Company, Maplewood, MN (US)

( * ) Notice: Subject to any disclaimer, the term of this patent is extended or adjusted under 35 U.S.C. 154(b) by 149 days.

(21) Appl. No.: 17/442,023

(22) PCT Filed: Mar. 10, 2020

(86) PCT No.: PCT/US2020/021890
§ 371 (c)(1),
(2) Date: Sep. 22, 2021

(87) PCT Pub. No.: WO2020/197760
PCT Pub. Date: Oct. 1, 2020

(65) Prior Publication Data
US 2022/0168152 A1 Jun. 2, 2022

Related U.S. Application Data

(60) Provisional application No. 62/823,222, filed on Mar. 25, 2019.

(51) Int. Cl.
*A61F 13/05* (2024.01)
*A61F 13/00* (2024.01)
(Continued)

(52) U.S. Cl.
CPC ........ *A61F 13/05* (2024.01); *A61F 13/00055* (2013.01); *A61F 13/00063* (2013.01);
(Continued)

(58) Field of Classification Search
CPC .......... A61F 13/00068; A61F 13/00055; A61F 13/00063; A61M 1/985; A61M 2205/3327; A61M 2205/3368
See application file for complete search history.

(56) References Cited

U.S. PATENT DOCUMENTS

| 1,355,846 A | 10/1920 | Rannells |
| 2,547,758 A | 4/1951 | Keeling |

(Continued)

FOREIGN PATENT DOCUMENTS

| AU | 550575 B2 | 3/1986 |
| AU | 745271 B2 | 3/2002 |

(Continued)

OTHER PUBLICATIONS

Louis C. Argenta, MD and Michael J. Morykwas, PhD; Vacuum-Assisted Closure: A New Method for Wound Control and Treatment: Clinical Experience; Annals of Plastic Surgery; vol. 38, No. 6, Jun. 1997; pp. 563-576.

(Continued)

*Primary Examiner* — Ariana Zimbouski
*Assistant Examiner* — Matthew Wrubleski (57) ABSTRACT

A system or apparatus including a dressing, a dressing interface, and a humidity sensor may be suitable for use with systems and methods for treating a tissue site. Embodiments of the apparatus are provided for treating a tissue site with reduced pressure provided by a source of reduced pressure. The dressing may include a base layer, a sealing member disposed proximate the base layer to define an enclosure providing a sealed space over the tissue site, and an absorbent member disposed within the enclosure. The dressing interface may comprise a reduced-pressure port configured to be coupled to the source of reduced pressure and a therapy port covered by a hydrophobic filter defining a reduced-pressure pathway between the hydrophobic filter and the (Continued)

source of reduced pressure. The humidity sensor may comprise a sensing portion fluidly coupled to the reduced-pressure pathway and an output for providing a humidity signal that indicates the amount of fluid extracted from the tissue site and stored by the absorbent member. Other dressings, systems, and methods are disclosed.

20 Claims, 4 Drawing Sheets

(51) Int. Cl.
*A61F 13/0203* (2024.01)
*A61M 1/00* (2006.01)

(52) U.S. Cl.
CPC ......... *A61F 13/0223* (2013.01); *A61M 1/915* (2021.05); *A61M 1/985* (2021.05); *A61M 1/92* (2021.05); *A61M 2205/3327* (2013.01); *A61M 2205/3368* (2013.01); *A61M 2205/3389* (2013.01); *A61M 2205/3592* (2013.01); *A61M 2205/50* (2013.01); *A61M 2205/7527* (2013.01); *A61M 2205/7536* (2013.01)

(56) References Cited

U.S. PATENT DOCUMENTS

| | | |
|---|---|---|
| 2,632,443 A | 3/1953 | Lesher |
| 2,682,873 A | 7/1954 | Evans et al. |
| 2,910,763 A | 11/1959 | Lauterbach |
| 2,969,057 A | 1/1961 | Simmons |
| 3,066,672 A | 12/1962 | Crosby, Jr. et al. |
| 3,367,332 A | 2/1968 | Groves |
| 3,520,300 A | 7/1970 | Flower, Jr. |
| 3,568,675 A | 3/1971 | Harvey |
| 3,648,692 A | 3/1972 | Wheeler |
| 3,682,180 A | 8/1972 | McFarlane |
| 3,826,254 A | 7/1974 | Mellor |
| 4,080,970 A | 3/1978 | Miller |
| 4,096,853 A | 6/1978 | Weigand |
| 4,139,004 A | 2/1979 | Gonzalez, Jr. |
| 4,165,748 A | 8/1979 | Johnson |
| 4,184,510 A | 1/1980 | Murry et al. |
| 4,233,969 A | 11/1980 | Lock et al. |
| 4,245,630 A | 1/1981 | Lloyd et al. |
| 4,256,109 A | 3/1981 | Nichols |
| 4,261,363 A | 4/1981 | Russo |
| 4,275,721 A | 6/1981 | Olson |
| 4,284,079 A | 8/1981 | Adair |
| 4,297,995 A | 11/1981 | Golub |
| 4,333,468 A | 6/1982 | Geist |
| 4,373,519 A | 2/1983 | Errede et al. |
| 4,382,441 A | 5/1983 | Svedman |
| 4,392,853 A | 7/1983 | Muto |
| 4,392,858 A | 7/1983 | George et al. |
| 4,419,097 A | 12/1983 | Rowland |
| 4,465,485 A | 8/1984 | Kashmer et al. |
| 4,475,909 A | 10/1984 | Eisenberg |
| 4,480,638 A | 11/1984 | Schmid |
| 4,525,166 A | 6/1985 | Leclerc |
| 4,525,374 A | 6/1985 | Vaillancourt |
| 4,540,412 A | 9/1985 | Van Overloop |
| 4,543,100 A | 9/1985 | Brodsky |
| 4,548,202 A | 10/1985 | Duncan |
| 4,551,139 A | 11/1985 | Plaas et al. |
| 4,569,348 A | 2/1986 | Hasslinger |
| 4,605,399 A | 8/1986 | Weston et al. |
| 4,608,041 A | 8/1986 | Nielsen |
| 4,640,688 A | 2/1987 | Hauser |
| 4,655,754 A | 4/1987 | Richmond et al. |
| 4,664,662 A | 5/1987 | Webster |
| 4,710,165 A | 12/1987 | McNeil et al. |
| 4,733,659 A | 3/1988 | Edenbaum et al. |
| 4,743,232 A | 5/1988 | Kruger |
| 4,758,220 A | 7/1988 | Sundblom et al. |
| 4,787,888 A | 11/1988 | Fox |
| 4,826,494 A | 5/1989 | Richmond et al. |
| 4,838,883 A | 6/1989 | Matsuura |
| 4,840,187 A | 6/1989 | Brazier |
| 4,863,449 A | 9/1989 | Therriault et al. |
| 4,872,450 A | 10/1989 | Austad |
| 4,878,901 A | 11/1989 | Sachse |
| 4,897,081 A | 1/1990 | Poirier et al. |
| 4,906,233 A | 3/1990 | Moriuchi et al. |
| 4,906,240 A | 3/1990 | Reed et al. |
| 4,919,654 A | 4/1990 | Kalt |
| 4,941,882 A | 7/1990 | Ward et al. |
| 4,953,565 A | 9/1990 | Tachibana et al. |
| 4,969,880 A | 11/1990 | Zamierowski |
| 4,985,019 A | 1/1991 | Michelson |
| 5,037,397 A | 8/1991 | Kalt et al. |
| 5,086,170 A | 2/1992 | Luheshi et al. |
| 5,092,858 A | 3/1992 | Benson et al. |
| 5,100,396 A | 3/1992 | Zamierowski |
| 5,134,994 A | 8/1992 | Say |
| 5,149,331 A | 9/1992 | Ferdman et al. |
| 5,167,613 A | 12/1992 | Karami et al. |
| 5,176,663 A | 1/1993 | Svedman et al. |
| 5,215,522 A | 6/1993 | Page et al. |
| 5,232,453 A | 8/1993 | Plass et al. |
| 5,261,893 A | 11/1993 | Zamierowski |
| 5,278,100 A | 1/1994 | Doan et al. |
| 5,279,550 A | 1/1994 | Habib et al. |
| 5,298,015 A | 3/1994 | Komatsuzaki et al. |
| 5,342,376 A | 8/1994 | Ruff |
| 5,344,415 A | 9/1994 | DeBusk et al. |
| 5,358,494 A | 10/1994 | Svedman |
| 5,437,622 A | 8/1995 | Carion |
| 5,437,651 A | 8/1995 | Todd et al. |
| 5,527,293 A | 6/1996 | Zamierowski |
| 5,549,584 A | 8/1996 | Gross |
| 5,556,375 A | 9/1996 | Ewall |
| 5,607,388 A | 3/1997 | Ewall |
| 5,636,643 A | 6/1997 | Argenta et al. |
| 5,645,081 A | 7/1997 | Argenta et al. |
| 6,071,267 A | 6/2000 | Zamierowski |
| 6,135,116 A | 10/2000 | Vogel et al. |
| 6,241,747 B1 | 6/2001 | Ruff |
| 6,287,316 B1 | 9/2001 | Agarwal et al. |
| 6,345,623 B1 | 2/2002 | Heaton et al. |
| 6,488,643 B1 | 12/2002 | Tumey et al. |
| 6,493,568 B1 | 12/2002 | Bell et al. |
| 6,553,998 B2 | 4/2003 | Heaton et al. |
| 6,814,079 B2 | 11/2004 | Heaton et al. |
| 7,516,740 B2 * | 4/2009 | Meier ................. A61M 16/109 128/203.14 |
| 7,846,141 B2 | 12/2010 | Weston |
| 8,062,273 B2 | 11/2011 | Weston |
| 8,216,198 B2 | 7/2012 | Heagle et al. |
| 8,251,979 B2 | 8/2012 | Malhi |
| 8,257,327 B2 | 9/2012 | Blott et al. |
| 8,398,614 B2 | 3/2013 | Blott et al. |
| 8,449,509 B2 | 5/2013 | Weston |
| 8,529,548 B2 | 9/2013 | Blott et al. |
| 8,535,296 B2 | 9/2013 | Blott et al. |
| 8,551,060 B2 | 10/2013 | Schuessler et al. |
| 8,568,386 B2 | 10/2013 | Malhi |
| 8,679,081 B2 | 3/2014 | Heagle et al. |
| 8,834,451 B2 | 9/2014 | Blott et al. |
| 8,926,592 B2 | 1/2015 | Blott et al. |
| 9,017,302 B2 | 4/2015 | Vitaris et al. |
| 9,198,801 B2 | 12/2015 | Weston |
| 9,211,365 B2 | 12/2015 | Weston |
| 9,289,542 B2 | 3/2016 | Blott et al. |
| 2002/0077661 A1 | 6/2002 | Saadat |
| 2002/0078733 A1 * | 6/2002 | Seakins ................. G01N 27/223 73/29.02 |
| 2002/0115951 A1 | 8/2002 | Norstrem et al. |
| 2002/0120185 A1 | 8/2002 | Johnson |
| 2002/0143286 A1 | 10/2002 | Tumey |
| 2010/0022990 A1 * | 1/2010 | Karpowicz ............. A61M 1/74 604/543 |

(56) References Cited

U.S. PATENT DOCUMENTS

| | | | |
|---|---|---|---|
| 2011/0253136 A1* | 10/2011 | Sweeney | A61M 16/024 128/207.18 |
| 2012/0125333 A1* | 5/2012 | Bedford | A61M 16/109 128/205.12 |
| 2014/0163491 A1 | 6/2014 | Schuessler et al. | |
| 2015/0080788 A1 | 3/2015 | Blott et al. | |
| 2015/0100045 A1* | 4/2015 | Allen | A61M 1/96 604/543 |
| 2015/0231314 A1* | 8/2015 | Robinson | A61M 1/915 604/319 |
| 2019/0008694 A1* | 1/2019 | Piotrowski | A61B 5/6804 |
| 2019/0159939 A1* | 5/2019 | Coulthard | A61F 13/0216 |
| 2020/0353137 A1* | 11/2020 | Long | A61M 1/966 |

FOREIGN PATENT DOCUMENTS

| | | | |
|---|---|---|---|
| AU | 755496 B2 | 12/2002 | |
| CA | 2005436 A1 | 6/1990 | |
| CN | 105997345 A * | 10/2016 | A61M 1/0025 |
| DE | 26 40 413 A1 | 3/1978 | |
| DE | 43 06 478 A1 | 9/1994 | |
| DE | 29 504 378 U1 | 9/1995 | |
| EP | 0100148 A1 | 2/1984 | |
| EP | 0117632 A2 | 9/1984 | |
| EP | 0161865 A2 | 11/1985 | |
| EP | 0358302 A2 | 3/1990 | |
| EP | 1018967 A1 | 7/2000 | |
| GB | 692578 A | 6/1953 | |
| GB | 2195255 A | 4/1988 | |
| GB | 2 197 789 A | 6/1988 | |
| GB | 2 220 357 A | 1/1990 | |
| GB | 2 235 877 A | 3/1991 | |
| GB | 2 329 127 A | 3/1999 | |
| GB | 2 333 965 A | 8/1999 | |
| JP | 4129536 B2 | 8/2008 | |
| SG | 71559 | 4/2002 | |
| WO | 80/02182 A1 | 10/1980 | |
| WO | 87/04626 A1 | 8/1987 | |
| WO | 90/010424 A1 | 9/1990 | |
| WO | 93/009727 A1 | 5/1993 | |
| WO | 94/20041 A1 | 9/1994 | |
| WO | 96/05873 A1 | 2/1996 | |
| WO | 97/18007 A1 | 5/1997 | |
| WO | 99/13793 A1 | 3/1999 | |
| WO | 2014/143488 A1 | 9/2014 | |
| WO | 2015/123353 A1 | 8/2015 | |
| WO | 2019/140448 A1 | 7/2019 | |

OTHER PUBLICATIONS

Susan Mendez-Eatmen, RN; "When wounds Won't Heal" RN Jan. 1998, vol. 61 (1); Medical Economics Company, Inc., Montvale, NJ, USA; pp. 20-24.
James H. Blackburn II, MD et al.: Negative-Pressure Dressings as a Bolster for Skin Grafts; Annals of Plastic Surgery, vol. 40, No. 5, May 1998, pp. 453-457; Lippincott Williams & Wilkins, Inc., Philidelphia, PA, USA.
John Masters; "Reliable, Inexpensive and Simple Suction Dressings"; Letter to the Editor, British Journal of Plastic Surgery, 1998, vol. 51 (3), p. 267; Elsevier Science/The British Association of Plastic Surgeons, UK.
S.E. Greer, et al. "The Use of Subatmospheric Pressure Dressing Therapy to Close Lymphocutaneous Fistulas of the Groin" British Journal of Plastic Surgery (2000), 53, pp. 484-487.
George V. Letsou, MD., et al; "Stimulation of Adenylate Cyclase Activity in Cultured Endothelial Cells Subjected to Cyclic Stretch"; Journal of Cardiovascular Surgery, 31, 1990, pp. 634-639.
Orringer, Jay, et al; "Management of Wounds in Patients with Complex Enterocutaneous Fistulas"; Surgery, Gynecology & Obstetrics, Jul. 1987, vol. 165, pp. 79-80.
International Search Report for PCT International Application PCT/GB95/01983; Nov. 23, 1995.
PCT International Search Report for PCT International Application PCT/GB98/02713; Jan. 8, 1999.
PCT Written Opinion; PCT International Application PCT/GB98/02713; Jun. 8, 1999.
PCT International Examination and Search Report, PCT International Application PCT/GB96/02802; Jan. 15, 1998 & Apr. 29, 1997.
PCT Written Opinion, PCT International Application PCT/GB96/02802; Sep. 3, 1997.
Dattilo, Philip P., Jr., et al; "Medical Textiles: Application of an Absorbable Barbed Bi-directional Surgical Suture"; Journal of Textile and Apparel, Technology and Management, vol. 2, Issue 2, Spring 2002, pp. 1-5.
Kostyuchenok, B.M., et al; "Vacuum Treatment in the Surgical Management of Purulent Wounds"; Vestnik Khirurgi, Sep. 1986, pp. 18-21 and 6 page English translation thereof.
Davydov, Yu. A., et al; "Vacuum Therapy in the Treatment of Purulent Lactation Mastitis"; Vestnik Khirurgi, May 14, 1986, pp. 66-70, and 9 pages English translation thereof.
Yusupov. Yu.N., et al; "Active Wound Drainage", Vestnki Khirurgi, vol. 138, Issue 4, 1987, and 7 page English translation thereof.
Davydov, Yu.A., et al; "Bacteriological and Cytological Assessment of Vacuum Therapy for Purulent Wounds"; Vestnik Khirugi, Oct. 1988, pp. 48-52, and 8 page English translation thereof.
Davydov, Yu.A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.
Chariker, Mark E., M.D., et al; "Effective Management of incisional and cutaneous fistulae with closed suction wound drainage"; Contemporary Surgery, vol. 34, Jun. 1989, pp. 59-63.
Egnell Minor, Instruction Book, First Edition, 300 7502, Feb. 1975, pp. 24.
Egnell Minor: Addition to the Users Manual Concerning Overflow Protection—Concerns all Egnell Pumps, Feb. 3, 1983, pp. 2.
Svedman, P.: "Irrigation Treatment of Leg Ulcers", The Lancet, Sep. 3, 1983, pp. 532-534.
Chinn, Steven D. et al.: "Closed Wound Suction Drainage", The Journal of Foot Surgery, vol. 24, No. 1, 1985, pp. 76-81.
Arnljots, Björn et al.: "Irrigation Treatment in Split-Thickness Skin Grafting of Intractable Leg Ulcers", Scand J. Plast Reconstr. Surg., No. 19, 1985, pp. 211-213.
Svedman, P.: "A Dressing Allowing Continuous Treatment of a Biosurface", IRCS Medical Science: Biomedical Technology, Clinical Medicine, Surgery and Transplantation, vol. 7, 1979, p. 221.
Svedman, P et al: "A Dressing System Providing Fluid Supply and Suction Drainage Used for Continuous of Intermittent Irrigation", Annals of Plastic Surgery, vol. 17, No. 2, Aug. 1986, pp. 125-133.
N.A. Bagautdinov, "Variant of External Vacuum Aspiration in the Treatment of Purulent Diseases of Soft Tissues," Current Problems in Modern Clinical Surgery: Interdepartmental Collection, edited by V. Ye Volkov et al. (Chuvashia State University, Cheboksary, U.S.S.R. 1986); pp. 94-96 (copy and certified translation).
K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.
G. Živadinovi?, V. ?uki?, Ž. Maksimovi?, ?. Radak, and P. Peška, "Vacuum Therapy in the Treatment of Peripheral Blood Vessels," Timok Medical Journal 11 (1986), pp. 161-164 (copy and certified translation).
F.E. Johnson, "An Improved Technique for Skin Graft Placement Using a Suction Drain," Surgery, Gynecology, and Obstetrics 159 (1984), pp. 584-585.
A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (copy and certified translation).
M. Schein, R. Saadia, J.R. Jamieson, and G.A.G. Decker, "The 'Sandwich Technique' in the Management of the Open Abdomen," British Journal of Surgery 73 (1986), pp. 369-370.
D.E. Tribble, An Improved Sump Drain-Irrigation Device of Simple Construction, Archives of Surgery 105 (1972) pp. 511-513.

(56) References Cited

OTHER PUBLICATIONS

M.J. Morykwas, L.C. Argenta, E.I. Shelton-Brown, and W. McGuirt, "Vacuum-Assisted Closure: A New Method for Wound Control and Treatment: Animal Studies and Basic Foundation," Annals of Plastic Surgery 38 (1997), pp. 553-562 (Morykwas I).

C.E. Tennants, "The Use of Hypermia in the Postoperative Treatment of Lesions of the Extremities and Thorax," Journal of the American Medical Association 64 (1915), pp. 1548-1549.

Selections from W. Meyer and V. Schmieden, Bier's Hyperemic Treatment in Surgery, Medicine, and the Specialties: A Manual of Its Practical Application, (W.B. Saunders Co., Philadelphia, PA 1909), pp. 17-25, 44-64, 90-96, 167-170, and 210-211.

V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").

V.A. Kuznetsov & N.a. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").

V.A. Solovev, Dissertation Abstract, Treatment and Prevention of Suture Failures after Gastric Resection (S.M. Kirov Gorky State Medical Institute, Gorky, U.S.S.R. 1988) ("Solovev Abstract").

V.A.C. ® Therapy Clinical Guidelines: A Reference Source for Clinicians; Jul. 2007.

International Search Report and Written Opinion for Corresponding Application No. PCT/US2020/021890, mailed May 29, 2020.

\* cited by examiner

ABSORBENT DRESSING WITH REMOTE MEASUREMENT OF DRESSING MOISTURE

This application claims the benefit, under 35 U.S.C. § 119(e), of the filing of U.S. Provisional Patent Application Ser. No. 62/823,222, entitled "ABSORBENT DRESSING WITH REMOTE MEASUREMENT OF DRESSING MOISTURE," filed Mar. 25, 2019, which is incorporated herein by reference for all purposes.

TECHNICAL FIELD

Related Applications

The embodiments set forth in the appended claims relate generally to tissue treatment systems and more particularly, but without limitation, to systems and methods for providing negative-pressure therapy utilizing absorbent dressings with remote measurement of dressing moisture.

BACKGROUND

Depending on the medical circumstances, reduced pressure may be used for, among other things, reduced-pressure therapy to encourage granulation at a tissue site, draining fluids at a tissue site, closing a wound, reducing edema, promoting perfusion, and fluid management. Common dressings, systems, and methods may be susceptible to leaks and blockage that can cause a reduction in the efficiency of the therapy, or a complete loss of therapy. Such a situation can occur, for example, if the amount of fluid in the dressing or system exceeds the fluid capacity of the dressing or system. Prevention of leaks and blockages may be particularly important when only a limited power supply to the reduced pressure source and other components is available. Thus, improvements to dressings, systems, and methods that enhance the management of fluid extracted from a tissue site for increasing reliability, efficiency, and the useable life of the dressing and system are desirable.

While the clinical benefits of negative-pressure therapy are widely known, improvements to therapy systems, components, and processes may benefit healthcare providers and patients.

BRIEF SUMMARY

New and useful systems, apparatuses, and methods for storing bodily fluids in an absorbent dressing in a negative-pressure therapy environment are set forth in the appended claims. Illustrative embodiments are also provided to enable a person skilled in the art to make and use the claimed subject matter. Some embodiments are illustrative of an apparatus or system for delivering negative-pressure to a tissue site, which can be used in conjunction with remote sensing of the humidity that may represent the amount of fluid extracted from a tissue site and stored in the absorbent dressing.

In one embodiment, an apparatus is provided for treating a tissue site with reduced pressure provided by a source of reduced pressure. The apparatus may comprise a dressing including a base layer, a sealing member disposed proximate the base layer to define an enclosure providing a sealed space over the tissue site, and an absorbent member disposed within the enclosure. The apparatus may further comprise a dressing interface having a reduced-pressure port configured to be coupled to the source of reduced pressure and a therapy port covered by a hydrophobic filter defining a reduced-pressure pathway between the hydrophobic filter and the source of reduced pressure. The dressing interface may be disposed proximate the sealing member so that the therapy port is in fluid communication with the enclosure. The apparatus may further comprise a humidity sensor having a sensing portion fluidly coupled to the reduced-pressure pathway and further having an output for providing a humidity signal that provides an indication corresponding to the amount of fluid extracted from the tissue site and stored by the absorbent member.

In one embodiment of the apparatus, the reduced-pressure pathway includes a fluid conductor between the reduced-pressure port and the source of reduced pressure. In some embodiments, the sensing portion of the humidity sensor is fluidly coupled to a portion of the reduced-pressure pathway defined by the fluid conductor. In another embodiment of the apparatus, the sensing portion of the humidity sensor is fluidly coupled to a portion of the reduced-pressure pathway between the reduced-pressure port and the hydrophobic filter. In yet another embodiment of the apparatus, the humidity sensor may further comprise a temperature sensor having a sensing portion fluidly coupled to the reduced-pressure pathway and having an output for providing a temperature signal corresponding to the humidity signal.

In another embodiment of the apparatus, the apparatus may further comprise a control device electrically coupled to the output of the humidity sensor for receiving the humidity signal. The control device may comprise an output adapted to provide an indication of the amount of fluid stored by the dressing based on the humidity signal. In yet another embodiment of the apparatus, the apparatus may further comprise a control device and the dressing interface may further include an ambient port having a valve fluidly coupling the reduced-pressure pathway to the ambient environment. In some embodiments, the valve may be coupled to the control device and actionable to open and close the ambient port in response to an output from the control device.

In another embodiment, a method is provided for treating a tissue site with reduced pressure provided by a source of reduced pressure. The method may comprise positioning a dressing on the tissue site, wherein the dressing includes a base layer having a plurality of apertures, a sealing member adapted to be positioned proximate the base layer to define an enclosure providing a sealed space over the tissue site, and an absorbent member disposed within the enclosure. The method may further comprise disposing a dressing interface proximate the sealing member, wherein the dressing interface includes a therapy port covered by a hydrophobic filter defining a reduced-pressure pathway between the hydrophobic filter and the source of reduced pressure, and the therapy port is in fluid communication with the enclosure. The method may further comprise applying reduced pressure to the enclosure through the reduced-pressure pathway and the hydrophobic filter, and sensing humidity within the reduced-pressure pathway with a humidity sensor having an output that provides a humidity signal in response to the application of reduced pressure. The method may comprise providing the humidity signal to a display indicating the amount of fluid extracted from the tissue site and stored by the dressing based on the humidity signal.

While the clinical benefits of negative-pressure therapy and instillation therapy are widely known, improvements to therapy systems, components, and processes may benefit healthcare providers and patients.

BRIEF DESCRIPTION OF THE DRAWINGS

A more complete understanding of this specification may be obtained by reference to the following detailed description when taken in conjunction with the accompanying drawings wherein.

DETAILED DESCRIPTION OF ILLUSTRATIVE EMBODIMENTS

In the following detailed description of non-limiting, illustrative embodiments, reference is made to the accompanying drawings that form a part hereof. Other embodiments may be utilized, and logical, structural, mechanical, electrical, and chemical changes may be made without departing from the scope of this specification. To avoid detail not necessary to enable those skilled in the art to practice the embodiments described herein, the description may omit certain information known to those skilled in the art. The following detailed description is provided without limitation and with the scope of the illustrative embodiments being defined by the appended claims.

Figure 1:
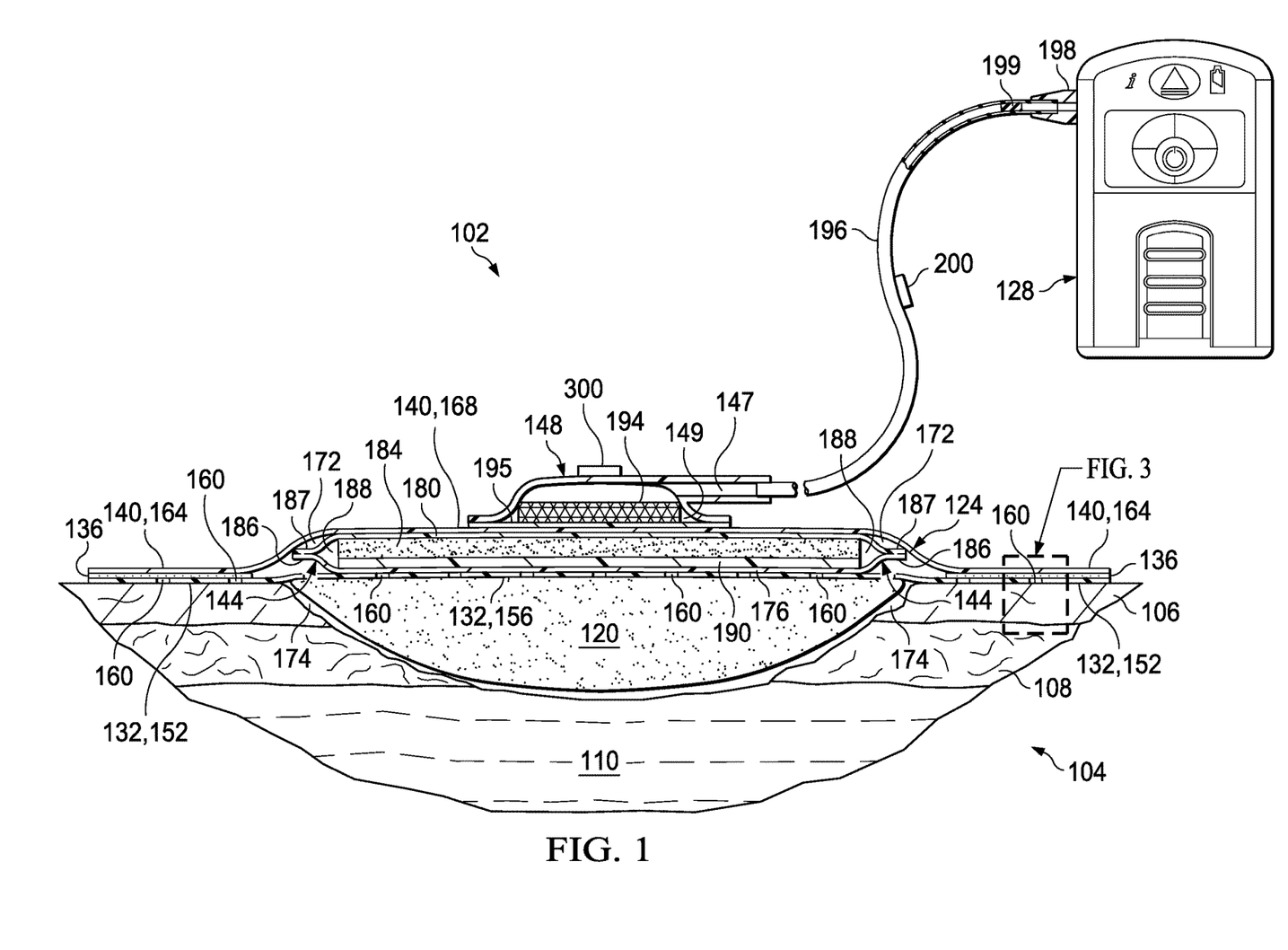
FIG. 1 is a cut-away view of an illustrative embodiment of a system for treating a tissue site depicting an illustrative embodiment of a dressing deployed at a tissue site.

Referring to the drawings, FIG. 1 depicts an embodiment of a system 102 for treating a tissue site 104 of a patient. The tissue site 104 may extend through or otherwise involve an epidermis 106, a dermis 108, and a subcutaneous tissue 110. The tissue site 104 may be a sub-surface tissue site as depicted in FIG. 1 that extends below the surface of the epidermis 106. Further, the tissue site 104 may be a surface tissue site (not shown) that predominantly resides on the surface of the epidermis 106. The system 102 may provide therapy to, for example, the epidermis 106, the dermis 108, and the subcutaneous tissue 110, regardless of the positioning of the system 102 or the type of tissue site. The system 102 may also be utilized without limitation at other tissue sites.

Further, the tissue site 104 may be the bodily tissue of any human, animal, or other organism, including bone tissue, adipose tissue, muscle tissue, dermal tissue, vascular tissue, connective tissue, cartilage, tendons, ligaments, or any other tissue. Treatment of tissue site 104 may include removal of fluids, e.g., exudate or ascites. As used herein, unless otherwise indicated, "or" does not require mutual exclusivity.

Continuing with FIG. 1, the system 102 may include an interface manifold 120, a dressing 124, and a reduced-pressure source 128. The interface manifold 120 may be adapted to be positioned proximate the tissue site 104, such as, for example, by cutting or otherwise shaping the interface manifold 120 in any suitable manner to fit the tissue site 104. As described below, the interface manifold 120 may be adapted to be positioned in fluid communication with the tissue site 104 to distribute reduced pressure to the tissue site 104. In one embodiment, the interface manifold 120 may be positioned in contact with the tissue site 104. The interface manifold 120 may be formed from any manifold material or flexible bolster material that provides a vacuum space, or treatment space, such as, for example, a porous and permeable foam or foam-like material, a member formed with pathways, a graft, or a gauze, etc. As a more specific, non-limiting example, the interface manifold 120 may be a reticulated, open-cell polyurethane or polyether foam that allows good permeability of fluids while under a reduced pressure. One such foam material is the VAC® GranuFoam® material available from Kinetic Concepts, Inc. (KCI) of San Antonio, Texas Any material or combination of materials may be used as a manifold material for the interface manifold 120 provided that the manifold material is operable to distribute reduced pressure. The term "manifold" as used herein generally refers to a substance or structure that is provided to assist in applying reduced pressure to, delivering fluids to, or removing fluids from a tissue site. A manifold typically includes a plurality of flow channels or pathways. The plurality of flow channels may be interconnected to improve distribution of fluids provided to and removed from the area of tissue around the manifold. Examples of manifolds may include, without limitation, devices that have structural elements arranged to form flow channels, cellular foam, such as open-cell foam, porous tissue collections, and liquids, gels, and foams that include or cure to include flow channels.

A material with a higher or lower density than GranuFoam® material may be desirable for the interface manifold 120 depending on the application. Among the many possible materials, the following may be used: GranuFoam® material, Foamex® technical foam (www-.foamex.com), a molded bed of nails structures, a patterned grid material such as those manufactured by Sercol Industrial Fabrics, 3D textiles such as those manufactured by Baltex of Derby, U.K., a gauze, a flexible channel-containing member, a graft, etc. In some instances, ionic silver may be desirable to add to the foam by, for example, a micro bonding process. Other substances, such as anti-microbial agents, may be added to the foam as well.

In one embodiment, the interface manifold 120 may comprise a porous, hydrophobic material. The hydrophobic characteristics of the interface manifold 120 may prevent the interface manifold 120 from directly absorbing fluid, such as exudate, from the tissue site 104, but allow the fluid to pass through.

Continuing with FIG. 1, the dressing 124 may be adapted to provide reduced pressure from the reduced-pressure source 128 to the interface manifold 120, and to store fluid extracted from the tissue site 104 through the interface manifold 120. The dressing 124 may include a base layer 132, an adhesive 136, a sealing member 140, and a fluid management assembly 144. The dressing 124 may also include a dressing interface 148.

Figure 2:
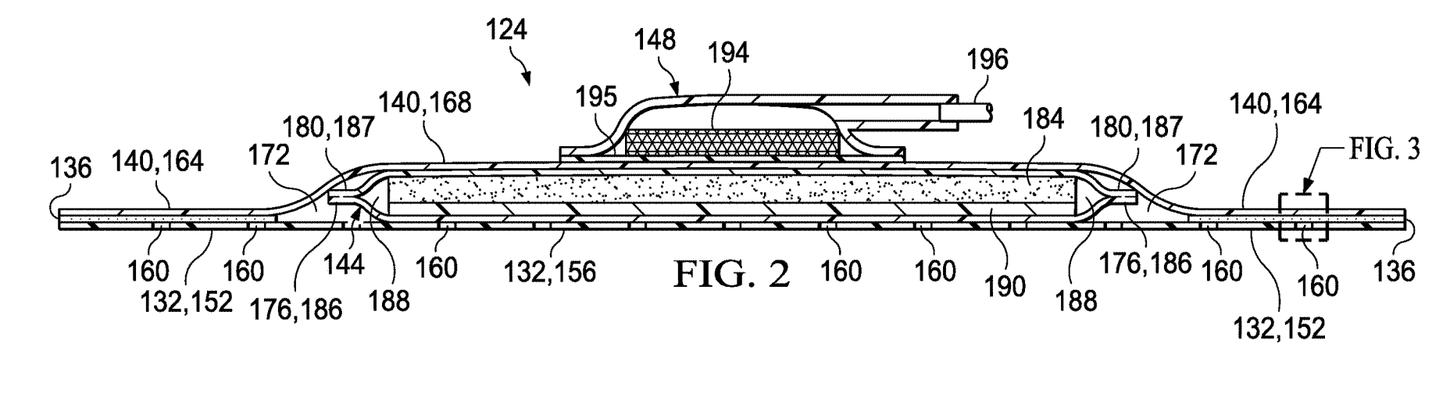
FIG. 2 is a cut-away view of the dressing of FIG. 1.
Figure 3:
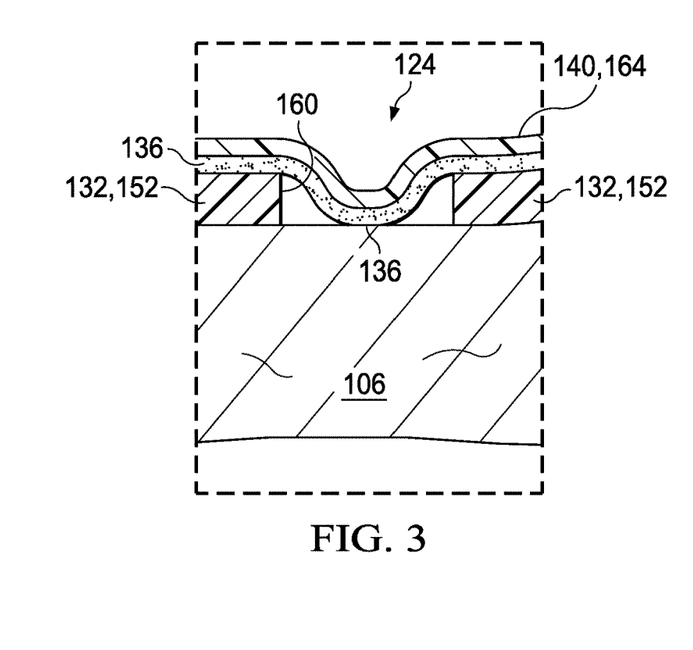
FIG. 3 is a detail view taken at reference FIG. 3 and depicted in FIG. 1, illustrating the dressing of FIG. 1 positioned proximate tissue surrounding the tissue site.

Referring to FIGS. 1-3, the base layer 132 may have a periphery 152 surrounding a central portion 156 and a plurality of apertures 160 disposed through the periphery 152 and the central portion 156. The base layer 132 may cover the interface manifold 120 and tissue surrounding the tissue site 104 such that the central portion 156 of the base layer 132 is positioned proximate the interface manifold 120 and the periphery 152 of the base layer 132 is positioned proximate the tissue surrounding the tissue site 104. In this manner, the periphery 152 of the base layer 132 may surround the interface manifold 120. Further, the apertures 160 in the base layer 132 may be in fluid communication with the interface manifold 120 and the tissue surrounding the tissue site 104.

The apertures 160 in the base layer 132 may have any shape, such as, for example, circles, squares, stars, ovals, polygons, slits, complex curves, rectilinear shapes, triangles, or other shapes. Each aperture 160 of the plurality of apertures 160 may have a diameter. The diameter of each of the apertures 160 may be between about 6 mm to about 50 mm. The apertures 160 may have a uniform pattern or may be randomly distributed on the base layer 132. The size and configuration of the apertures 160 may be designed to control the adherence of the dressing 124 to the epidermis 106 as described below.

The base layer 132 may be a soft material suitable for providing a fluid seal with the tissue site 104 as described herein. For example, the base layer 132 may comprise a silicone gel, a soft silicone, hydrocolloid, hydrogel, polyurethane gel, polyolefin gel, hydrogenated styrenic copolymer gels, a foamed gel, a soft closed cell foam such as polyurethanes and polyolefins coated with an adhesive, polyurethane, polyolefin, or hydrogenated styrenic copolymers. The base layer may have a thickness between about 500 microns ($\mu m$) and about 1000 microns ($\mu m$). In one embodiment, the base layer 132 has a stiffness between about 5 Shore OO and about 80 Shore OO. The base layer 132 may be comprised of hydrophobic or hydrophilic materials.

In some embodiments, the base layer 132 may be a hydrophobic-coated material. For example, the base layer 132 may be formed by coating a spaced material, such as, for example, woven, nonwoven, molded, or extruded mesh with a hydrophobic material. The hydrophobic material for the coating may be a soft silicone, for example. In this manner, the adhesive 136 may extend through openings in the spaced material analogous to the apertures 160 described herein.

The adhesive 136 may be in fluid communication with the apertures 160 in at least the periphery 152 of the base layer 132. In this manner, the adhesive 136 may be in fluid communication with the tissue surrounding the tissue site 104 through the apertures 160 in the base layer 132. As shown in FIG. 3, the adhesive 136 may extend through the plurality of apertures 160 to contact the epidermis 106 for securing the dressing 124 to, for example, the tissue surrounding the tissue site 104. The apertures 160 may provide sufficient contact of the adhesive 136 to the epidermis 106 to secure the dressing 124 about the tissue site 104. However, the configuration of the apertures 160 and the adhesive 136 may permit release and repositioning of the dressing 124 about the tissue site 104.

The adhesive 136 may be any medically-acceptable adhesive. For example, the adhesive 136 may comprise an acrylic adhesive, rubber adhesive, high-tack silicone adhesive, polyurethane, or other adhesive substance. In some embodiments, the adhesive 136 may be a pressure-sensitive adhesive comprising an acrylic adhesive with coating weight of 15 grams/m$^2$ (gsm) to 70 grams/m$^2$ (gsm). The adhesive 136 may be a continuous or a discontinuous layer of material. Discontinuities in the adhesive 136 may be provided by apertures (not shown) in the adhesive 136. The apertures in the adhesive 136 may be formed after application of the adhesive 136 or by coating the adhesive 136 in patterns on a carrier layer, such as, for example, a side of the sealing member 140 adapted to face the epidermis 106. Further, the apertures in the adhesive 136 may be sized to control the amount of the adhesive 136 extending through the apertures 160 in the base layer 132 to reach the epidermis 106. The apertures in the adhesive 136 may also be sized to enhance the Moisture Vapor Transfer Rate (MVTR) of the dressing 124.

Factors that may be utilized to control the adhesion strength of the dressing 124 may include the diameter and number of the apertures 160 in the base layer 132, the thickness of the base layer 132, the thickness and amount of the adhesive 136, and the tackiness of the adhesive 136. An increase in the amount of the adhesive 136 extending through the apertures 160 generally corresponds to an increase in the adhesion strength of the dressing 124. A decrease in the thickness of the base layer 132 generally corresponds to an increase in the amount of adhesive 136 extending through the apertures 160. Thus, the diameter and configuration of the apertures 160, the thickness of the base layer 132, and the amount and tackiness of the adhesive utilized may be varied to provide a desired adhesion strength for the dressing 124. For example, the thickness of the base layer 132 may be about 200 microns. The adhesive 136 may have a thickness of about 30 microns. Further, the adhesive 136 may have a tackiness of about 2000 grams per 25 centimeter wide strip. The diameter of the apertures 160 in the base layer 132 may be about 7 millimeters.

Continuing with FIGS. 1-3, the sealing member 140 may have a periphery 164 and a central portion 168. The periphery 164 of the sealing member 140 may be positioned proximate the periphery 152 of the base layer 132 such that the central portion 168 of the sealing member 140 and the central portion 156 of the base layer 132 define an enclosure 172. The adhesive 136 may be positioned at least between the periphery 164 of the sealing member 140 and the periphery 152 of the base layer 132. The sealing member 140 may cover the tissue site 104 to provide a fluid seal and a sealed space 174 between the tissue site 104 and the sealing member 140 of the dressing 124. Further, the sealing member 140 may cover tissue, such as a portion of the epidermis 106, surrounding the tissue site 104 to provide the fluid seal between the sealing member 140 and the tissue site 104.

The sealing member 140 may be formed from any material that allows for a fluid seal. A fluid seal may be a seal adequate to maintain reduced pressure at a desired site given the particular reduced pressure source or system involved. The sealing member 140 may comprise, for example, one or more of the following materials: hydrophilic polyurethane; cellulosics; hydrophilic polyamides; polyvinyl alcohol; polyvinyl pyrrolidone; hydrophilic acrylics; hydrophilic silicone elastomers; an INSPIRE 2301 material from Expopack Advanced Coatings of Wrexham, United Kingdom having, for example, an MVTR (inverted cup technique) of 14400 g/m$^2$/24 hours and a thickness of about 30 microns; a thin, uncoated polymer drape; natural rubbers; polyisoprene; styrene butadiene rubber; chloroprene rubber; polybutadiene; nitrile rubber; butyl rubber; ethylene propylene rubber; ethylene propylene diene monomer; chlorosulfonated polyethylene; polysulfide rubber; polyurethane (PU); EVA film; co-polyester; silicones; a silicone drape; a 3M Tegaderm® drape; a polyurethane (PU) drape such as one available from Avery Dennison Corporation of Pasadena, California; polyether block polyamide copolymer (PEBAX), for example, from Arkema, France; Expopack 2327; or other appropriate material.

The sealing member 140 may allow vapor and inhibit liquids from exiting the sealed space 174 provided by the dressing 124. The sealing member 140 may be a flexible, breathable film having a high MVTR of, for example, at least about 300 g/m² per 24 hours. The sealing member 140 may comprise a range of medically suitable films having a thickness between about 15 microns (μm) to about 50 microns (μm). In other embodiments, a low or no vapor transfer drape might be used.

The fluid management assembly 144 may be disposed in the enclosure 172 and may include a first wicking layer 176, a second wicking layer 180, and an absorbent layer 184. The absorbent layer 184 may be positioned in fluid communication between the first wicking layer 176 and the second wicking layer 180. The first wicking layer 176 may have a grain structure (not shown) adapted to wick fluid along a surface of the first wicking layer 176. Similarly, the second wicking layer 180 may have a grain structure (not shown) adapted to wick fluid along a surface of the second wicking layer 180. For example, the first and the second wicking layers 176, 180 may wick or otherwise transport fluid in a lateral direction along the surfaces of the first and the second wicking layers 176, 180, respectively. Fluid may be transported in this manner with or without application of reduced pressure. The surfaces of the first and the second wicking layers 176, 180 may be normal relative to the thickness of each of the first and the second wicking layers 176, 180. The wicking of fluid along the first and the second wicking layers 176, 180 may enhance the distribution of the fluid over a surface area of the absorbent layer 184 that may increase absorbent efficiency and resist fluid blockages. Fluid blockages may be caused by, for example, fluid pooling in particular location in the absorbent layer 184 rather than being distributed more uniformly across the absorbent layer 184. The laminate combination of the first and the second wicking layers 176, 180 and the absorbent layer 184 may be adapted as described above to maintain an open structure, resistant to blockage, that can maintain fluid communication with, for example, the tissue site 104.

In one embodiment, the absorbent layer 184 may be a hydrophilic material or other absorbent material adapted to absorb fluid from, for example, the tissue site 104. Materials suitable for the absorbent layer 184 may include Luquafleece® material, Texsus FP2326, BASF 402c, Technical Absorbents 2317 available from Technical Absorbents (www.techabsorbents.com), sodium polyacrylate super absorbers, cellulosics (carboxy methyl cellulose and salts such as sodium CMC), or alginates. Materials suitable for the first and second wicking layers 176, 180 may include any material having a grain structure capable of wicking fluid as described herein, such as, for example, Libeltex TDL2 80 gsm.

The fluid management assembly 144 may be a pre-laminated structure manufactured at a single location or simply individual layers of material stacked upon one another as described above. Individual layers of the fluid management assembly 144 may be bonded or otherwise secured to one another without adversely affecting fluid management by, for example, utilizing a solvent or non-solvent adhesive, or by thermal welding.

In one embodiment, the enclosure 172 defined by the base layer 132 and the sealing member 140 may include an anti-microbial layer 190. The addition of the anti-microbial layer 190 may reduce the probability of excessive bacterial growth within the dressing 124 to permit the dressing 124 to remain in place for an extended period. The anti-microbial layer 190 may be, for example, an additional layer included as a part of the fluid management assembly 144 as depicted in FIGS. 1 and 2, or a coating of an anti-microbial agent disposed in any suitable location within the dressing 124. The anti-microbial layer 190 may be comprised of elemental silver or similar compound, for example.

In some embodiments, the dressing interface 148 may comprise a chamber 147 having an opening or apertures that may be in fluid communication with the dressing 124 through an aperture (not shown) in the sealing member 140 when the dressing interface 148 is positioned proximate to the sealing member 140. In some embodiments, the dressing interface 148 may further comprise a reduced-pressure port 149 configured to be coupled to a source of reduced pressure such as, for example, the reduced-pressure source 128. Thus, in some embodiments, the dressing interface 148 may provide reduced pressure from the reduced-pressure source 128 through the reduced-pressure port 149 and the chamber 147 as a reduced-pressure pathway to the dressing 124. The dressing interface 148 may comprise a medical-grade, soft polymer or other pliable material. As non-limiting examples, the dressing interface 148 may be formed from polyurethane, polyethylene, polyvinyl chloride (PVC), fluorosilicone, or ethylene-propylene, etc. In one illustrative, non-limiting embodiment, dressing interface 148 may be molded from DEHP-free PVC. The dressing interface 148 may be formed in any suitable manner such as by molding, casting, machining, or extruding. Further, the dressing interface 148 may be formed as an integral unit or as individual components and may be coupled to the dressing 124 by, for example, adhesive or welding.

The dressing interface 148 may carry an odor filter 194 within the dressing interface 148 that is adapted to substantially preclude the passage of odors from the tissue site 104 out of the sealed space 174. Further, the dressing interface 148 may further comprise a primary hydrophobic filter 195 disposed within the chamber 147 or the reduced-pressure port 149 (not shown) that is adapted to substantially preclude the passage of liquids out of the sealed space 174. The odor filter 194 and the primary hydrophobic filter 195 may be disposed in the dressing interface 148 or other suitable location such that fluid communication between the reduced-pressure source 128 and the dressing 124 is provided through the odor filter 194 and the primary hydrophobic filter 195. In one embodiment, the odor filter 194 and the primary hydrophobic filter 195 may be secured within the dressing interface 148 in any suitable manner, such as by adhesive or welding. In another embodiment, the odor filter 194 and the primary hydrophobic filter 195 may be positioned in any location in the dressing 124 that is in fluid communication with the atmosphere or with the reduced-pressure source 128. However, it should be understood that some embodiments of the dressing interface 148 may not require a hydrophobic filter such as, for example, the primary hydrophobic filter 195. The odor filter 194 may also be positioned in any suitable location in the system 102 that is in fluid communication with the tissue site 104.

The odor filter 194 may be comprised of a carbon material in the form of a layer or particulate. For example, the odor filter 194 may comprise a woven carbon cloth filter such as those manufactured by Chemviron Carbon, Ltd. of Lancashire, United Kingdom (www.chemvironcarbon.com). The primary hydrophobic filter 195 may be comprised of a material that is liquid impermeable and vapor permeable. For example, the primary hydrophobic filter 195 may comprise a material manufactured under the designation MMT-314 by W. L. Gore & Associates, Inc. of Newark, Delaware, United States, or similar materials. The primary hydrophobic filter 195 may be provided in the form of a membrane or layer.

In some embodiments, the reduced-pressure source 128 may provide reduced pressure to the dressing 124 and the sealed space 174. The reduced-pressure source 128 may be any suitable device for providing reduced pressure as described herein, such as, for example, a vacuum pump, wall suction, a micro-pump, a mechanical pumping device, or other source. In some embodiments, the reduced-pressure source 128 may be an integral portion of the dressing interface 148 or, in some other embodiments, may be a separate component positioned adjacent or proximate the dressing interface 148. In yet other embodiments, the reduced-pressure source 128 may be fluidly coupled to the dressing interface 148 by a fluid conductor or a conduit 196 that may have a lumen 197 that may be in fluid communication with the dressing 124.

As used herein, "reduced pressure" may refer to a pressure less than the ambient pressure at a tissue site being subjected to treatment. This reduced pressure may be less than the atmospheric pressure. The reduced pressure may also be less than a hydrostatic pressure at a tissue site. Unless otherwise indicated, values of pressure stated herein are gauge pressures. While the amount and nature of reduced pressure applied to a tissue site may vary according to the application, the reduced pressure may be between about −5 mm Hg to about −500 mm Hg. In some embodiments, the reduced pressure may be between about −100 mm Hg to about −200 mm Hg.

The reduced pressure delivered may be constant or varied (patterned or random) and may be delivered continuously or intermittently. Although the terms "vacuum" and "negative pressure" may be used to describe the pressure applied to the tissue site, the actual pressure applied to the tissue site may be more than the pressure normally associated with a complete vacuum. Consistent with the use herein, an increase in reduced pressure or vacuum pressure may refer to a relative reduction in absolute pressure. An increase in reduced pressure may correspond to a reduction in pressure (more negative relative to ambient pressure) and a decrease in reduced pressure may correspond to an increase in pressure (less negative relative to ambient pressure).

In some embodiments, the conduit 196 may be coupled in fluid communication between the reduced-pressure source 128 and the dressing interface 148 forming a portion of the reduced-pressure pathway that may be in fluid communication with the dressing 124 for providing reduced-pressure to the dressing 124 through the dressing interface 148 which provides the other portion of the reduced-pressure pathway. The dressing interface 148 may be fluidly coupled to the conduit 196 in any suitable manner, such as, for example, by an adhesive, solvent or non-solvent bonding, welding, or interference fit. The aperture in the sealing member 140 described above (but not shown) may provide fluid communication between the dressing 124 and the dressing interface 148 including the chamber 147, the primary hydrophobic filter 195, and the reduced-pressure port 149. In one embodiment, the conduit 196 may be inserted directly into the dressing 124 through the aperture in the sealing member 140 to provide fluid communication with the reduced-pressure source 128 without utilization of the dressing interface 148. In some embodiments, the conduit 196 may carry a hydrophobic filter (not shown) in the lumen 197 to substantially prevent the flow of liquids into the conduit 196. The hydrophobic filter may be, for example, a porous, sintered polymer cylinder sized to fit the dimensions of the internal lumen 197 to substantially preclude liquid from bypassing the cylinder. The reduced-pressure source 128 may also be directly coupled in fluid communication with the dressing 124 and/or the sealing member 140. The conduit 196 may be, for example, a flexible polymer tube. A distal end of the conduit 196 may include a coupling 198 for attachment to the reduced-pressure source 128.

The conduit 196 may have a secondary hydrophobic filter 199 disposed within the internal lumen 197 such that fluid communication between the reduced-pressure source 128 and the dressing 124 is provided through the secondary hydrophobic filter 199. The secondary hydrophobic filter 199 may be, for example, a porous, sintered polymer cylinder sized to fit the dimensions of the internal lumen 197 to substantially preclude liquid from bypassing the cylinder. The secondary hydrophobic filter 199 may also be treated with an absorbent material adapted to swell when brought into contact with liquid to block the flow of the liquid. The secondary hydrophobic filter 199 may be positioned at any location within the internal lumen 197. However, positioning the secondary hydrophobic filter 199 within the internal lumen 197 closer toward the reduced-pressure source 128, rather than the dressing 124, may allow a user to detect the presence of liquid in the internal lumen 197.

In operation, the dressing 124 may be positioned on the tissue site and sealed, after the dressing interface 148 may be disposed proximate the sealing member as described above. In some embodiments, reduced pressure may be applied through the reduced-pressure pathway to the enclosure 172 for drawing fluids in from the tissue site and stored in the fluid management assembly 144 of the dressing 124. In certain embodiments, it is desirable to know how much fluid has been stored in the absorbent layer 184 and, more specifically, the remaining capacity of the absorbent layer 184. In some embodiments, this has been accomplished by removing the dressing 124 from the tissue site, weighing the fluid management assembly 144, and then replacing the dressing 124 over the tissue site. Such a procedure is complicated and may interrupt the therapy process and/or destroy the dressing 124 during the removal process. Thus, it would be desirable to be able to determine the amount of fluid stored in the absorbent layer 184 without removing the dressing 124 such as, for example, by measuring the wound moisture content of the enclosure 172 with a humidity sensor and doing so without direct contact with the tissue site. Positioning a humidity sensor adjacent to, or in direct contact with, the tissue site would require additional packaging and sterilization complexity associated with the requirement to sterilize any electronics that contacts the tissue site. Thus, it would also be desirable to position a humidity sensor having a sensing portion disposed in the reduced-pressure pathway without contacting the tissue site wherein the humidity being measured corresponds to the amount of fluid extracted from the tissue site and stored in the absorbent layer 184. It would also be desirable to include a temperature sensor with the humidity sensor in order to calculate the dew point associated with the enclosure 172.

Measuring the humidity in the reduced-pressure pathway can be a good approximation of the humidity within the enclosure adjacent the tissue site and, therefore, can provide an accurate indication of the amount of fluid extracted from the tissue site and stored in the absorbent layer. In one example embodiment, the humidity sensor may be positioned so that the sensing portion is fluidly coupled to that portion of the reduced-pressure pathway within the chamber 147 between the opening of the chamber 147 and the reduced-pressure port 149. For example, the system 102 may further comprise a sensor assembly 300 that may include a humidity sensor that is positioned so that the sensing portion is fluidly coupled to that portion of the reduced-pressure pathway within the chamber 147 between the primary hydrophobic filter 195 and the reduced-pressure port 149. In another embodiment, the dressing interface 148 may not include the primary hydrophobic filter 195 so that the sensing portion of the humidity sensor is fluidly coupled to that portion of the reduced-pressure pathway between the sealing member 140 and the reduced-pressure port 149.

In another example embodiment requiring a dressing interface 148 having a lower profile, the humidity sensor may be positioned so that the sensor portion is fluidly coupled to the portion of the reduced-pressure pathway within the lumen 197 of the conduit 196 between the chamber 147 and the reduced-pressure source 128. Referring to both FIGS. 1 and 4 for example, the system 102 may further comprise a sensor assembly 200 that may include a humidity sensor 201 that is positioned so that the sensing portion is fluidly coupled to the portion of the reduced-pressure pathway within the lumen 197 of the conduit 196 between the chamber 147 and the reduced-pressure source 128. In some embodiments, it may be desirable to position the humidity sensor as close to the chamber 147 as possible within the lumen 197 of the conduit 196 to minimize the air mass between the humidity sensor and the enclosure 172 to obtain a more accurate approximation of the humidity within the enclosure 172. However, it also should be understood that some embodiments of the dressing interface 148 may not require that a hydrophobic filter be disposed in the reduced-pressure pathway such as, for example, the hydrophobic filter 195.

Figure 5:
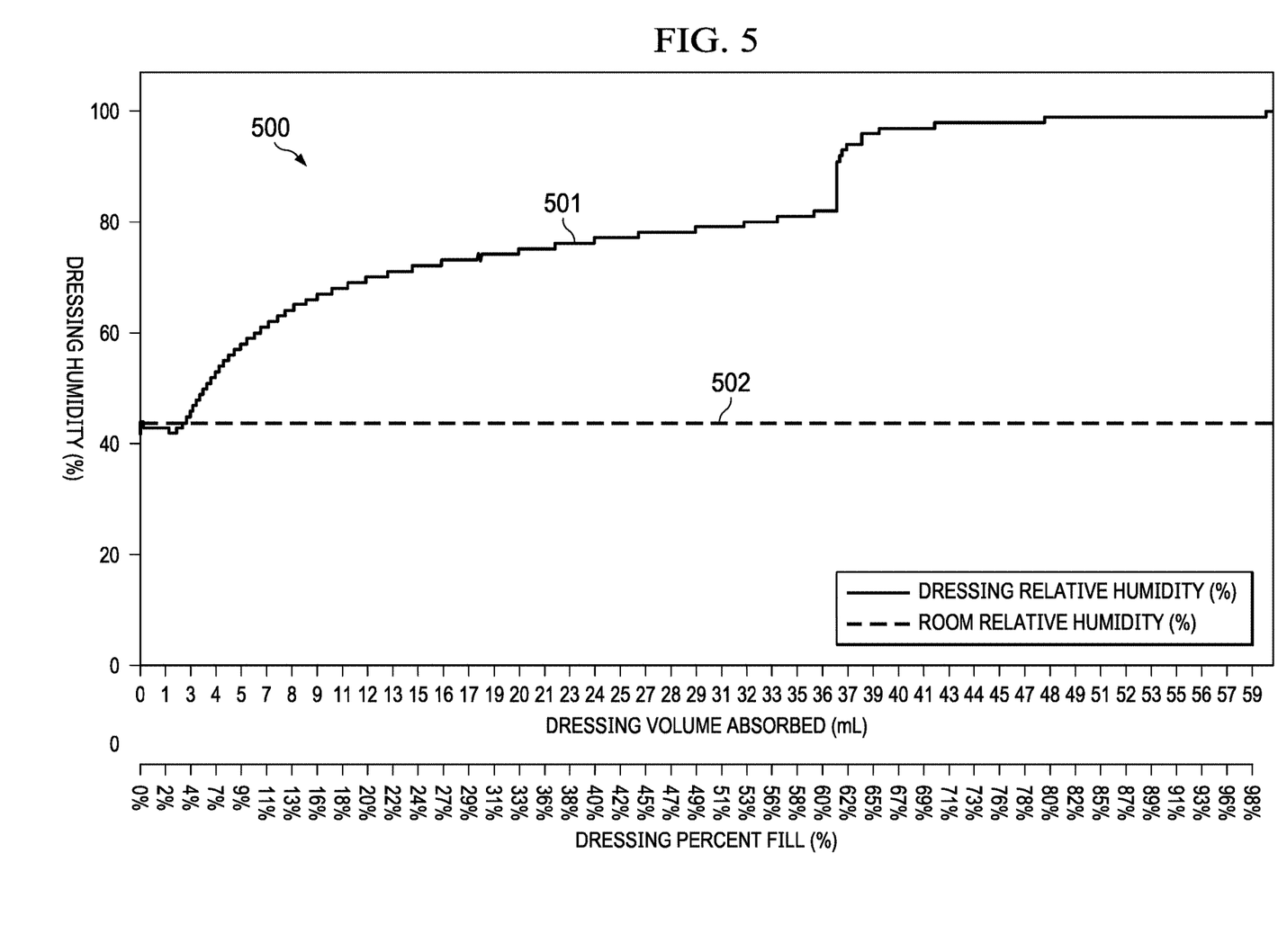
FIG. 5 is a graph illustrating the relative humidity measured by the sensor assembly of FIG. 4 indicating the humidity of the dressing and the ambient humidity proximate the dressing, versus the volume of fluid absorbed by the dressing and the corresponding percentage that the dressing is filled with the fluid.

FIG. 5 is a graph 500 illustrating the relative humidity measured by the humidity sensor 201 of the sensor assembly 200 indicating the relative humidity 501 within the enclosure 172 of the dressing 124 and the ambient humidity 502 proximate the dressing 124, versus the volume of fluid absorbed by the by the absorbent layer 184 and the corresponding percentage that the absorbent layer 184 is filled with the fluid. This graph 500 is an example embodiment that shows the relative humidity values for a dressing having a known maximum fluid capacity of about 60 mL. For example, the graph 500 indicates that the absorbent layer 184 has filled and stored about 50% of its capacity or about 30 mL when the relative humidity reaches about 80%. In another example, the graph 500 indicates that the absorbent layer 184 has filled and stored about 67% of its capacity or about 40 mL when the relative humidity reaches about 90%. In yet another example, the graph 500 indicates that the absorbent layer 184 has filled and stored about 98% of its capacity and close to being fully saturated at about 59 mL when the relative humidity reaches about 99%. As can be seen, the relative humidity 501 measured by the humidity sensor 201 of the sensor assembly 200 can provide an accurate indication of the amount of fluid extracted from the tissue site and stored in the absorbent layer 184 as indicated above.

Figure 4:
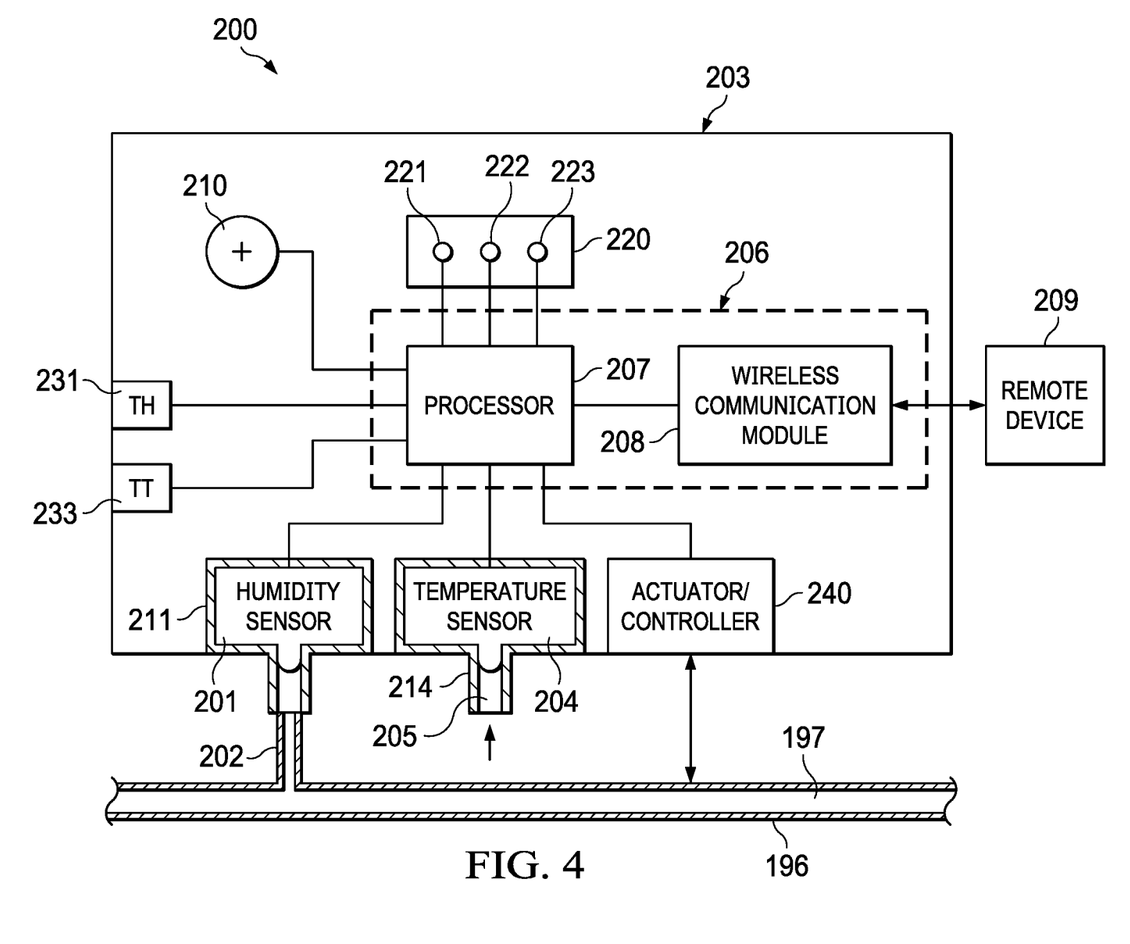
FIG. 4 is a schematic cross-section of an example embodiment of an in-line sensor assembly for sensing the humidity and temperature that may be associated with the dressing and system of FIG. 1.

FIG. 4 is a schematic view illustrating an example embodiment of the sensor assembly 200 including the humidity sensor 201 that may be used with some embodiments of the therapy system 102. In some embodiments, the humidity sensor 201 may include a humidity sensing port 202 configured to be fluidly coupled to the reduced-pressure pathway. In some embodiments, the sensor assembly 200 may further comprise a printed circuit board 203 on which the humidity sensor 201 may be mounted. In some embodiments, the humidity sensor 201 may comprise a temperature sensor may be a single integrated device such as, for example, Model HTU21D(F) humidity sensor available from Tyco Electronics. However, in some embodiments, the sensor assembly 200 may include a temperature sensor 204 mounted on the printed circuit board 203 wherein the temperature sensor 204 has a temperature sensing port 205 configured to be fluidly coupled to the ambient environment.

In some embodiments, the humidity sensor 201 also may comprise a second humidity sensor (not shown) that may be fluidly coupled through a second vent hole to sense the ambient environment. Alternatively, the sensor assembly 200 may further comprise a second humidity sensor having a sensing portion for sensing the humidity of the ambient environment and electrically coupled to electrical components and circuits such as, for example, a microprocessor. The second humidity sensor also may comprise a temperature sensor component. The second humidity sensor may be configured to sense the relative humidity of the ambient environment for comparison to the relative humidity of the reduced-pressure pathway sensed by the humidity sensor 201. Sensing a differential humidity from such comparisons may offer a number of advantages such as, for example, enhanced leak detection that distinguishes the type of leak occurring, full dressing determinations (automated fill assist), and enhanced the blockage detection, all of such advantages disclosed in Provisional Application No. 62/617, 517 filed Jan. 15, 2018, which is incorporated herein by reference.

The sensor assembly 200 may comprise one or more electronic components such as, for example, a controller 206 that may comprise a processor 207 and in some embodiments may further comprise a wireless communication module 208 electrically coupled to the processor 207 to enable wireless communication with other components of the therapy system 102 or other remote devices 209. The printed circuit boards may include electrical conductors and electronic components such as capacitors, resistors, or other active devices mounted on or within the printed circuit board. In some embodiments, the printed circuit board 203 may be coupled directly or indirectly to the dressing interface 148 or the conduit 196 as an upgrade for monitoring and/or controlling the humidity in the reduced-pressure pathway.

In some embodiments, the sensor assembly 200 may further comprise a power supply or electric potential source, such as a battery 210, for providing voltage to the components mounted on the printed circuit board 203. Embodiments can the humidity sensor 201 and the temperature sensor 204 may each be disposed in a receptacle mounted on the printed circuit board 203 such as, for example, receptacles 211 and 214, respectively, that may be configured to couple them to the conduit 196, or alternatively to the dressing interface 148, for sensing the humidity and temperature through the humidity sensing port 202 and the temperature sensing port 205, respectively. In some embodiments, the sensor assembly 200 may be modified or supplied as original equipment to mechanically couple the humidity sensor 201 and the temperature sensor 204 to the respective ports for sensing the humidity and temperature in the reduced-pressure pathway. In some embodiments, the humidity sensor 201 and the temperature sensor 204 may be coupled directly to the conduit 196, or alternatively to the dressing interface 148, for sensing the humidity and temperature.

In some embodiments, the printed circuit board 203 also may include a signal interface or indicator electrically coupled to outputs of the processor 207 that provides certain indications of the humidity signal to a user of the therapy system 102. In some embodiments, the indicator may be a visual device, such as a liquid crystal device (LCD) 220 or a light emitting diode (LED) 221, an auditory device, such as a speaker or auditory pulse emitter, a tactile device, such as a moving protrusion, or an olfactory device. In some embodiments, the indicator may be multiple devices such as, for example, a display comprising multiple LEDs emitting different wavelengths of light including, for example, LEDs 221, 222, and 223. The LCD 220 may be coupled to outputs of the processor 207 for receiving a humidity signal from the humidity sensor 201 and in some embodiments a temperature signal from the temperature sensor 204. In the some embodiments, the LCD 220 may provide signals indicative of various operating states and other information such as, for example, the relative humidity, the ambient temperature, the dew point, the amount of fluid stored in the absorbent layer 184, the percentage of fluid stored in the absorbent layer 184, and the absorbent full status.

In some embodiments, the sensor assembly 200 may further comprise an electronic storage device, such as a memory, and other devices such as, for example, other passive and active devices including input and output devices. In some embodiments, the input devices may include switches or a touchscreen for a user to provide signals indicative of a target humidity (TH) and/or a target temperature (TT) to the processor 207 for providing an indication warning the user or caregiver that the absorbent layer 184 has reached that target humidity and/or target temperature such as, for example, an indication that the absorbent layer 184 is close to being full or fully saturated. For example, the sensor assembly 200 may include a switch 231 and/or a switch 233 electrically coupled to the processor 207 for setting the processor 207 with the desired target humidity (TH) and/or the desired target temperature (TT). In some embodiments, the sensor assembly 200 may include other input buffers or controllers on the printed circuit board 203 needed by peripheral devices associated with the other components of system 102. For example, the sensor assembly 200 may further comprise an actuator or controller 240 electrically coupled to the processor 207 and mechanically coupled to the conduit 196 for closing and opening the lumen 197, wherein the lumen 197 is closed in response to the humidity reaching a target humidity (TH) as the absorbent layer 184 is filling and the lumen 197 is opened in response to the humidity reaching another target humidity (TH) as fluid is evaporating from the absorbent layer 184.

In some embodiments, the controller 206 may be a single chip comprising the processor 207 and the wireless communication module 208 electrically coupled to the processor 207. Using a wireless communications module 208 has the advantage of eliminating an electrical conductor between the humidity sensor 201 and other components of the therapy system 102 or remote peripheral devices when in use during therapy treatments. In some embodiments, for example, the electrical circuits and/or components associated with the humidity sensor 201, the temperature sensor 204, the switch 231, the switch 233, and other inputs and output devices may be electrically coupled to other components of the therapy system 102 and other peripheral devices having wireless capability by wireless means such as, for example, an integrated device implementing Bluetooth® Low Energy wireless technology. More specifically, the wireless communication module 208 may be a Bluetooth® Low Energy system-on-chip that includes a microprocessor (an example of the microprocessors referred to hereinafter) such as the nRF51822 chip available from Nordic Semiconductor. The wireless communications module 208 may be implemented with other wireless technologies suitable for use in the medical environment such as radio frequency identification (RFID). In some embodiments, for example, the wireless communications module 208 may include wireless communication technologies that not only provide operators with a method of retrieving humidity and temperature data such as, for example, the dew point, the percentage of fluid stored in the absorbent layer 184, the absorbent full status, and other alarm conditions, but also provide closed-loop feedback to the processor 207 for automatically adjusting and correcting therapy parameters that control other components of the system such as, for example, the controller 240.

In operation of the system 102 according to one illustrative embodiment, the interface manifold 120 may be disposed proximate to the tissue site 104. The dressing 124 may then be applied over the interface manifold 120 and the tissue site 104 to form the sealed space 174. Specifically, the base layer 132 may be applied covering the interface manifold 120 and the tissue surrounding the tissue site 104. The materials described above for the base layer 132 may have a tackiness for holding the dressing 124 initially in position. The tackiness may be such that if an adjustment is desired, the dressing 124 may be removed and reapplied. Once the dressing 124 is in the desired position, a force may be applied, such as hand pressure, on a side of the sealing member 140 facing outwards from the tissue site 104. The force applied to the sealing member 140 may cause at least some portion of the adhesive 136 to extend through the plurality of apertures 160 and into contact with the tissue surrounding the tissue site 104, such as the epidermis 106, to releaseably adhere the dressing 124 about the tissue site 104. In this manner, the configuration of the dressing 124 may provide an effective and reliable seal against challenging anatomical surfaces, such as an elbow or heal, at and around the tissue site 104. Further, the dressing 124 may permit re-application or re-positioning to, for example, correct air leaks caused by creases and other discontinuities in the dressing 124 and the tissue site 104. The ability to rectify leaks may increase the reliability of the therapy and reduce power consumption.

As the dressing 124 comes into contact with fluid from the tissue site 104, the fluid may move through the apertures 160 toward the fluid management assembly 144. The fluid management assembly 144 may wick or otherwise move the fluid through the interface manifold 120 and away from the tissue site 104. As described above, the interface manifold 120 may be adapted to communicate fluid from the tissue site 104 rather than store the fluid. Thus, relative to the interface manifold 120, the fluid management assembly 144 may exhibit absorbent properties that may be more absorbent than any absorbent properties that may be exhibited by the interface manifold 120. The fluid management assembly 144 being more absorbent than the interface manifold 120 may provide an absorbent gradient through the dressing 124 that attracts fluid from the tissue site 104 to the fluid management assembly 144. Thus, fluid management assembly 144 may be adapted to wick, pull, draw, or otherwise attract fluid from the tissue site 104 through the interface manifold 120. The fluid may initially come into contact with the first wicking layer 176. The first wicking layer 176 may distribute the fluid laterally along the surface of the first wicking layer 176 for absorption and storage within the absorbent layer 184. Similarly, fluid coming into contact with the second wicking layer 180 may be distributed laterally along the surface of the second wicking layer 180 for absorption within the absorbent layer 184.

A method for treating a tissue site with reduced pressure provided by a source of reduced pressure is also disclosed and, in some embodiments, may comprise positioning a dressing on the tissue site, wherein the dressing may include a base layer having a plurality of apertures, a sealing member adapted to be positioned proximate the base layer to define an enclosure providing a sealed space over the tissue site, and an absorbent member disposed within the enclosure. In some embodiments, the method may further comprise disposing a dressing interface proximate the sealing member, wherein the dressing interface may include a therapy port covered by a hydrophobic filter that defines a reduced-pressure pathway between the hydrophobic filter and the source of reduced pressure, and wherein the therapy port is in fluid communication with the enclosure. In some embodiments, the method may further comprise applying reduced pressure to the enclosure through the reduced-pressure pathway and the hydrophobic filter, and sensing the humidity within the reduced-pressure pathway with a humidity sensor having an output that provides a humidity signal in response to the application of reduced pressure. In some embodiments, the method may further comprise providing the humidity signal to a display indicating the amount of fluid extracted from the tissue site and stored by the dressing based on the humidity signal.

Although this specification discloses advantages in the context of certain illustrative, non-limiting embodiments, various changes, substitutions, permutations, and alterations may be made without departing from the scope of the specification as defined by the appended claims. Further, any feature described in connection with any one embodiment may also be applicable to any other embodiment.

We claim:

1. A system for treating a tissue site with reduced pressure provided by a source of reduced pressure, comprising:
   a dressing including:
   a base layer having a periphery and a plurality of apertures adapted to cover the tissue site,
   a sealing member having a periphery adapted to be positioned proximate the periphery of the base layer to define an enclosure with the base layer, and
   an absorbent member disposed within the enclosure between the base layer and the sealing member;
   a dressing interface having a hydrophobic filter and disposed proximate the sealing member in fluid communication with the enclosure through the hydrophobic filter;
   a fluid conductor in fluid communication with the dressing interface and adapted to be coupled to the source of reduced pressure for providing reduced pressure to the enclosure;
   a first humidity sensor having a first sensing portion fluidly coupled to the fluid conductor between the dressing interface and the source of reduced pressure and having a first output for providing a first humidity signal, the first humidity sensor further including a temperature sensor having a sensing portion fluidly coupled to the fluid conductor and having a temperature output for providing a temperature signal corresponding to the first humidity signal;
   a second humidity sensor having a second sensing portion fluidly coupled to an ambient environment and having a second output for providing a second humidity signal;
   an actuator coupled to the fluid conductor, the actuator configured to close and open the fluid conductor; and
   a control device electrically coupled with the first humidity sensor, the second humidity sensor, and the actuator, the control device configured to receive a user input setting a fluid target, compare the first output and the second output, determine a fluid condition of the dressing based on the comparison of the first output and the second output, communicate with the actuator to close the fluid conductor in response to the first humidity signal indicating that the first output has reached a first target humidity and open the fluid conductor in response to the first humidity signal indicating that the first output has reached a second target humidity after the first target humidity, and determine a dew point based on the first output and the temperature output.

2. The system of claim 1, wherein the first humidity signal corresponds to an amount of fluid extracted from the tissue site and stored by the dressing.

3. The system of claim 2, wherein the control device is electrically coupled to the first output of the first humidity sensor for receiving the first humidity signal.

4. The system of claim 3, wherein the control device comprises an output adapted to provide an indication of the amount of fluid stored by the dressing based on the first humidity signal.

5. The system of claim 4, wherein the control device is configured to provide a dressing filled signal when humidity measured by the first humidity sensor is equal to or greater than the fluid target based on the first humidity signal.

6. The system of claim 5, wherein the control device further comprises a wireless transmitter for providing the amount of fluid stored by the dressing and the dressing filled signal.

7. The system of claim 1, wherein the fluid condition is at least one of a leak in the system, a full dressing, or a blockage in the system.

8. The system of claim 1, wherein at least the fluid target and the first target humidity are set via at least one of a switch or a touchscreen of the control device.

9. An apparatus for treating a tissue site with reduced pressure provided by a source of reduced pressure, comprising:
   a dressing configured to define an enclosure providing a sealed space over the tissue site;
   a dressing interface having a reduced-pressure port configured to be coupled to the source of reduced pressure and a therapy port covered by a hydrophobic filter defining a reduced-pressure pathway between the hydrophobic filter and the source of reduced pressure, wherein the dressing interface is disposed proximate the dressing so that the therapy port is in fluid communication with the enclosure;
   a first humidity sensor having a first sensing portion fluidly coupled to the reduced-pressure pathway and having a first output for providing a first humidity signal corresponding to an amount of fluid extracted from the tissue site and stored by the dressing, the first humidity sensor further including a temperature sensor having a sensing portion fluidly coupled to the reduced-pressure pathway and having a temperature output for providing a temperature signal corresponding to the first humidity signal;
   a second humidity sensor having a second sensing portion fluidly coupled to an ambient environment and having a second output for providing a second humidity signal;
   an actuator coupled to the reduced-pressure pathway, the actuator configured to close and open the reduced-pressure pathway; and
   a control device electrically coupled with the first humidity sensor, the second humidity sensor, and the actuator, the control device configured to receive a user input setting a fluid target, compare the first output and the second output, determine a fluid condition of the dressing based on the comparison of the first output and the second output, and communicate with the actuator to close the reduced-pressure pathway in response to the first humidity signal indicating that the first output has reached a first target humidity and open the reduced-pressure pathway in response to the first humidity signal indicating that the first output has reached a second target humidity after the first target humidity, and determine a dew point based on the first output and the temperature output.

10. The apparatus of claim 9, wherein the reduced-pressure pathway includes a fluid conductor between the reduced-pressure port and the source of reduced pressure, the first sensing portion of the first humidity sensor being fluidly coupled to a portion of the reduced-pressure pathway defined by the fluid conductor.

11. The apparatus of claim 9, wherein the first sensing portion of the first humidity sensor is fluidly coupled to a portion of the reduced-pressure pathway between the reduced-pressure port and the hydrophobic filter.

12. The apparatus of claim 9, wherein the dressing interface further comprises an ambient port including a valve fluidly coupling the reduced-pressure pathway to the ambient environment, wherein the valve is coupled to the control device and actionable to open and close the ambient port in response to an output from the control device.

13. A method for treating a tissue site with reduced pressure provided by a source of reduced pressure, comprising:
positioning a dressing on the tissue site, the dressing defining an enclosure providing a sealed space over the tissue site;
disposing a dressing interface proximate the dressing, the dressing interface having a therapy port covered by a hydrophobic filter defining a reduced-pressure pathway between the hydrophobic filter and the source of reduced pressure, the therapy port being in fluid communication with the enclosure;
applying reduced pressure to the enclosure through the reduced-pressure pathway and the hydrophobic filter;
sensing humidity within the reduced-pressure pathway with a first humidity sensor having a first output that provides a first humidity signal in response to application of reduced pressure;
sensing humidity of an ambient environment with a second humidity sensor having a second output that provides a second humidity signal;
sensing temperature associated with the first humidity signal within the reduced-pressure pathway with a temperature sensor having a temperature output that provides a temperature signal;
electrically coupling a control device to the first humidity sensor, the second humidity sensor, and an actuator coupled to the reduced-pressure pathway;
comparing, with the control device, the first output and the second output to determine an amount of fluid extracted from the tissue site and stored by the dressing;
setting the control device with a fluid target and a first target humidity received from user input to at least one switch or a touchscreen of the control device;
determining a dew point based on the first output and the temperature output;
controlling the actuator with the control device to close the reduced-pressure pathway in response to the first humidity signal indicating that the first output has reached a first target humidity and to open the reduced-pressure pathway in response to the first humidity signal indicating that the first output has reached a second target humidity after the first target humidity; and
providing the amount of fluid extracted from the tissue site and stored by the dressing to a display.

14. The method of claim 13, wherein the humidity within the reduced-pressure pathway is sensed by the first humidity sensor within the dressing interface.

15. The method of claim 13, wherein the humidity within the reduced-pressure pathway is sensed by the first humidity sensor between the dressing interface and the source of reduced pressure.

16. The method of claim 13, further comprising electrically coupling the control device to the first output of the first humidity sensor and the second output of the second humidity sensor for receiving the first humidity signal and the second humidity signal.

17. The method of claim 16, further comprising providing a dressing filled signal when the humidity within the reduced-pressure pathway measured by the first humidity sensor is equal to or greater than the fluid target based on the first humidity signal.

18. The method of claim 16, further comprising providing an output from the control device wherein the output is configured to provide an indication of an amount of fluid stored by the dressing based on the first humidity signal and the second humidity signal.

19. The method of claim 16, further comprising communicating humidity signals between the control device and a remote device utilizing a wireless transceiver coupled to the control device for providing data regarding an amount of fluid stored by the dressing.

20. The method of claim 13, further comprising purging the reduced-pressure pathway proximate the first humidity sensor with ambient environment through an ambient port including a valve fluidly coupling the reduced-pressure pathway to the ambient environment, wherein the valve is actionable to open and close the ambient port in response to the control device.

* * * * *